United States Patent [19]
Adam et al.

[11] Patent Number: 6,136,198
[45] Date of Patent: *Oct. 24, 2000

[54] PROCESS AND DEVICE FOR SEPARATION WITH VARIABLE-LENGTH

[75] Inventors: Philippe Adam, Maxeville; Roger Narc Nicoud, Richardrenic; Michel Bailly; Olivier Ludemann-Hombourger, both of Nancy, all of France

[73] Assignee: Institut Francais du Petrole, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/208,765

[22] Filed: Dec. 10, 1998

[30] Foreign Application Priority Data

Oct. 29, 1998 [FR] France ................... 98/13.600

[51] Int. Cl.⁷ ................... B01D 15/08
[52] U.S. Cl. ................... 210/659; 210/198.2
[58] Field of Search ................... 210/635, 656, 210/659, 662, 672, 198.2

[56] References Cited

U.S. PATENT DOCUMENTS

| | | | |
|---|---|---|---|
| 4,498,991 | 2/1985 | Oroskar | 210/659 |
| 5,093,004 | 3/1992 | Hotier | 210/659 |
| 5,578,215 | 11/1996 | Hotier et al. | 210/659 |

FOREIGN PATENT DOCUMENTS 2721528 12/1995 France .
2754730 10/1996 France .

OTHER PUBLICATIONS

Nicoud et al., "Choice and Optimization of Operating Mode in Industrial Chromatography", Proceedings of the 9th International Symposium on Preparative and Industrial Chromatography PREP '92—Apr. 1992—Nancy. pp. 205–221.

Charton et al., "Complete design of a simulated moving bed", J. Chromatogr. A 702, (1995) pp. 97–112.

*Primary Examiner*—Ernest G. Therkorn
*Attorney, Agent, or Firm*—Millen, White, Zelano & Branigan, P.C.

[57] ABSTRACT

A process for separating at least one component of a mixture in a set of closed-loop chromatographic columns is described, whereby the loop comprises at least one feedstock injection point, a raffinate draw-off point, an eluant injection point, and an extract draw-off point, in which a determination is made between an injection point and a draw-off point or vice-versa a chromatographic zone, and at the end of a given period of time, all of the injection and draw-off points are shifted by one column or column section in a given direction that is defined relative to that of the flow of a main fluid that circulates through the loop. During the period, the shifting of different injection and draw-off points of a column or column section is done at different times in such a way that the lengths of the zones that are defined by said different points are variable. The process is useful for the seperation particularly of stereoisumers for pharmaceuticals.

13 Claims, No Drawings

PROCESS AND DEVICE FOR SEPARATION WITH VARIABLE-LENGTH

SUMMARY OF THE INVENTION

The invention relates to a process and a device for separating at least one component of a mixture by contact between liquid and solid phases in variable-length chromatographic zones.

It applies to chiral separations and in particular to the separation of stereoisomers that are used especially in the field of pharmaceutics.

There are different chromatographic processes that can be used for the production of chemical components on a large scale.

The publication by R. M. NICOUD and M. BAILLY (Choice and Optimization of Operating Mode in Industrial Chromatography, Proceeding of the 9th International Symposium on Preparative and Industrial Chromatography, PREP 92, April 1992, Nancy, pp. 205–220) illustrates this technological background.

These processes can be classified according to several criteria: the process can be either discontinuous or continuous, the composition of the eluent can be isocratic, or a composition gradient can be carried out.

One of these possibilities is the true standard moving-bed 4-zone countercurrent process where in a moving-bed system, with a view to producing a continuous countercurrent effect, solids circulate continuously in a closed loop past the fixed feedstock and eluant introduction points alternately, with draw-off points for a raffinate and an extract.

Since this process is perfectly well known and described, only the characteristics that are required to understand the nature of this invention are summarized below. For the operating mode in a True Moving Bed, countercurrent contact between the liquid and solid phases is made in the column, which can be divided into four different zones.

Zone 1: Everything that is located between the eluant injection lines and the extract draw-off lines Zone 2: Everything that is located between the extract draw-off lines and the feedstock injection lines Zone 3: Everything that is located between the feedstock injection lines and the raffinate draw-off lines Zone 4: Everything that is located between the raffinate draw-off lines and the eluant injection lines.

Because of the inlet/outlet flow rates, the liquid flow rate varies according to the zone, whereby $Q_I$, $Q_{II}$, $Q_{III}$, and $Q_{IV}$ are the respective flow rates in zones I, II, III, and IV.

In 1961, the UOP Company patented a process that makes it possible to simulate the movement of the solid by an elegant connection between the columns that are interconnected in a closed loop (U.S. Pat. Nos. 2,985,589; 3,291,726 and 3,268,605. This process, called a Simulated Moving Bed (LMS), then makes it possible to produce the True Moving Bed in practice in a simple way. Said process is characterized in that the feedstock and eluant introduction points are periodically advanced downstream (in the direction of circulation of the main fluid), while the draw-off points for a raffinate and an extract are advanced simultaneously and according to the same increment (at least one column, for example).

All of the inlet and output lines are therefore moved simultaneously with each period $\Delta T$ and cycle time, at the end of which time they find their initial position is equal to $Nc \times \Delta T$, whereby Nc is the total number of columns.

This process has been extensively described particularly by CHARTON and NICOUD (Complete Design of a Simulated Moving Bed, Journal of Chromatography 1995, 702, 97–102).

Only the minimum information that is necessary for good comprehension of this invention will be recapped below.

The inlet/outlet positions are moved simultaneously at fixed intervals. It is advised that the position of the line be marked by line (n), which indicates that at a given moment a given inlet/outlet line is connected to the inlet of column n. For example, in a 12-column system, feedstock (9) means that the feedstock line is connected to the inlet of column 9, whereas raffinate (11) means that the raffinate line is connected to the inlet of column 11.

By using this definition, a system can be represented by: El(3)/Ext(6)/Feedstock(9)/Raff(11). For this configuration, the number of columns in zones 1, II, III, and IV are respectively: 3/3/2/4. The configuration of the system is then completely defined by:

Inlet/Outlet No. of Columns

At time 0: El(3)/Ext(6)/Feedstock(9)/Raff(11) 3/3/2/4

After a given time (the PERIOD), all of the inlet/outlet positions are moved simultaneously by one column, and the system is described as follows:

At time $\Delta T$: El(4)/Ext(7)/Feedstock(10)/Raff(12) 3/3/2/4

After a new period, all of the positions will again be moved simultaneously by one column, and the system will then be described as follows:

At time $2 \times \Delta T$: El(5)/Ext(8)/Feedstock(11)/Raff(1) 3/3/2/4

At time $2 \times \Delta T$, the position of the raffinate has been moved from position 12 to position 1. Notice that position 1 can be written as position 13 modulo 12. ($[13]_{12}$).

This presentation can be generalized to simulated moving beds that comprise a number of columns Nc. For a simulated moving bed that consists of Nc columns, it is obvious that no position can exceed Nc. For the sake of simplicity, we will simply increase all of the positions by one unit with each movement, and we will define all of the modulo Nc positions (for example, $[8]_{Nc}=3$ if $Nc=5$).

If, at a given moment, the configuration of the simulated moving bed is El (e)/Ext(x)/Feedstock(f)/Raff(r), simple reasoning makes it possible to find the number of columns that are contained in each zone:

Zone 1: $Nb1=[x-e]_{Nc}$; Zone 2: $Nb2=[f-x]_{Nc}$

Zone 3: $Nb3=[r-f]_{Nc}$; Zone 4: $Nb4=[e-r]_{Nc}$

It is possible to verify simply that: Nb1+Nb2+Nb3+Nb4= Nc and the system is completely defined by Table 1.

TABLE 1

| Inlet/Outlet | | No. of Columns in Each Zone |
|---|---|---|
| At time 0: | El(e)/Ext(x)/Feed(f)/Raff(r) | Nb1/Nb2/Nb3/Nb4 |
| At time $\Delta T$: | El($[e + 1]_{Nc}$)/Ext($[x + 1]_{Nc}$)/ Feed($[f + 1]_{Nc}$)/Raff($[r + 1]_{Nc}$) | Nb1/Nb2/Nb3/Nb4 |

TABLE 1-continued

|  | Inlet/Outlet | No. of Columns in Each Zone |
|---|---|---|
| At time n × ΔT: | El([e + n]$_{Nc}$)/Ext([x + n]$_{Nc}$)/ Feed([f + n]$_{Nc}$)/Raff([r + n]$_{Nc}$) | Nb1/Nb2/Nb3/Nb4 |

The injection and draw-off points are shifted by one column after a period ΔT and by Nc columns after Nc periods. The number of columns in each zone remains unchanged. The injection and draw-off points therefore regain their initial positions after cycle time Nc×ΔT.

The main characteristics of the simulated moving bed systems (providing a practical implementation of the true moving bed) are defined by:

1. Zones that are defined by the positions of the inlet/outlet lines,
2. A set number of columns per zone,
3. Zones of fixed length,
4. Synchronized movement of all of the inlet/outlet lines.

Characteristics 2, 3, and 4 are due to the fact that the simulated moving bed simulates the behavior of the true moving bed.

According to French Patent 2,721,528, it is possible to correct the composition disturbances of the extract and the raffinate that are caused by the dead volume of the recycling pump that is located between the last and first beds of the adsorption column, by increasing by a suitable value the period of connection of a fluid injection flow or draw-off in the system each time that this flow passes from one position that is immediately in front to a position that is immediately behind the dead volume, and then by reducing said connection period when this flow moves from the position that is immediately behind the dead volume to the next position. Once per cycle, however, all of the inlets and outlets are shifted simultaneously. This technique makes it possible to compensate for the technological imperfections in a simple way in order to make it operate in a way that is close to that of an ideal simulated moving bed.

In the processes for separation in a simulated moving bed that use a small number of columns, it most often seems that the products that are recovered in the extract and in the raffinate exhibit different purities, excellent for one of the two but inadequate for the other. In some types of separation, when the adsorbent volume that is used is small, the levels of purity of the extract and the raffinate can even turn out to be inadequate, as can be seen in the examples.

One of the objects of the invention is to eliminate these drawbacks.

Another object is therefore to increase the purity of the product that is drawn off as an extract and as a raffinate.

Another object is to minimize the costs of the separation.

It was thus noted that by not simultaneously moving the positions of the inlets and the outlets of fluid during the period and during the cycle time, it was possible to obtain improved results.

More specifically, the invention relates to a separation process that is called VARICOL, at least one component of a mixture that contains it, in a device that has a set of chromatographic columns or chromatographic column sections that contain an adsorbent and are arranged in series and in a closed loop, whereby the loop comprises at least one feedstock injection point, a raffinate draw-off point, an eluant injection point, and an extract draw-off point, in which a chromatographic zone is determined by an injection point and a draw-off point or vice-versa, and at the end of a given period of time, all of the injection and draw-off points are shifted by one column or column section in a given direction that is defined relative to that of the flow of a main fluid that circulates through the loop, whereby the process is characterized in that during said period, the shifting of different injection and draw-off points of a column or column section is carried out at different times such that the lengths of the zones that are defined by said different points are variable.

The period is defined as the smallest time interval ΔT at the end of which each of the inlets and outlets has been shifted by one column or column section, whereby the shifting has not taken place simultaneously for all of the inlets and outlets. It should be noted that at the end of a cycle time Nc×ΔT, the system has regained its initial position.

The term adsorbent is used in its most general sense. It can be an adsorbent such as a molecular sieve, a zeolitic sieve, for example, that is used in the adsorption processes, or an adsorbent such as an ion-exchange resin. It may also be a stationary phase on a silica base, an inverse-phase adsorbent, and a chiral phase.

In a more detailed manner, it is possible to produce at least once the succession of following stages:

At moment t1 during said period ΔT, in a given direction, the position of the injection point or draw-off point is shifted relative to at least one zone by a column or column section, in such a way as to increase the length of said zone and to reduce the length of the zone that is adjacent to said zone, then at a moment t2 during said period, the position of an injection or draw-off point that is relative to at least one other zone is shifted in the same direction by a column or column section, in such a way as to increase the length of said other zone and to reduce the length of the zone that is adjacent to said other zone, and the operation is repeated if necessary such that after said time period ΔT, the same column configuration as the initial configuration is regained with a shifting of all of the positions of the injection points and draw-off points of a column or a column section.

According to a first implementation that is illustrated by Table 2, it is possible to continually vary the lengths of zones of a column, whereby the increase of one zone is compensated for by the reduction of the next zone.

TABLE 2

|  | Inlet/Outlet | No. of Columns in Each Zone |
|---|---|---|
| At time 0 | El(e)/Ext(x)/Feed(f)/Raff(r) | Nb1/Nb2/Nb3/Nb4 |
| At time dT1 | El([e + 1]$_{Nc}$)/Ext(x)/Feed(f)/Raff(r) | Nb1 − 1/Nb2/Nb3/Nb4 + 1 |
| At time dT2 | El([e + 1]$_{Nc}$)/Ext(x)/Feed(f)/Raff([r + 1]$_{Nc}$) | Nb1 − 1/Nb2 − 1/Nb3/Nb4 |
| At time dT3 | El([e + 1]$_{Nc}$)/Ext(x)/Feed([f + 1]$_{Nc}$)/Raff([r + 1]$_{Nc}$) | Nb1 − 1/Nb2 + 2/Nb3/Nb4 |
| At time ΔT | El([e + 1]$_{Nc}$)/Ext([x + 1]$_{Nc}$)/Feed([f + 1]$_{Nc}$)/Raff([r + 1]$_{Nc}$) | Nb1/Nb2/Nb3/Nb4 |
| At time ΔT + dT1: | El([e + 2]$_{Nc}$)/Ext([x + 1]$_{Nc}$)/Feed([f + 1]$_{Nc}$)/Raff([r + 1]$_{Nc}$) | Nb1 − 1/Nb2/Nb3/Nb4 + 1 |

TABLE 2-continued

| Inlet/Outlet | No. of Columns in Each Zone |
|---|---|
| At time ΔT + dT2: | El([e + 2]$_{Nc}$)/Ext([x + 1]$_{Nc}$)/ Feed([f + 1]$_{Nc}$)/Raff([r + 2]$_{Nc}$) | Nb1 − 1/Nb2/Nb3 + 1/ Nb4 |
| At time ΔT + dT3: | El([e + 2]$_{Nc}$)/Ext([x + 1]$_{Nc}$)/ Feed([f + 2]$_{Nc}$)/Raff([r + 2]$_{Nc}$) | Nb1 − 1/Nb2 + 1/Nb3/ Nb4 |
| At time 2 × ΔT | El([e + 2]$_{Nc}$)/Ext([x + 2]$_{Nc}$)/ Feed([f + 2]$_{Nc}$)/Raff([r + 2]$_{Nc}$) | Nb1/Nb2/Nb3/Nb4 |

According to a second implementation that is illustrated by Table 3, the increase in length of a zone can be compensated for by a reduction of the opposite zone.

TABLE 3

| Inlet/Outlet | No. of Columns in Each Zone |
|---|---|
| At time 0 | El(e)/Ext(x)/Feed(f)/Raff(r) | Nb1/Nb2/Nb3/Nb4 |
| At time dT1 | El([e + 1]$_{Nc}$)/Ext(x)/Feed(f)/ Raff([r + 1]$_{Nc}$) | Nb1 − 1/Nb2/Nb3 + 1/ Nb4 |
| At time ΔT | El([e + 1]$_{Nc}$)/Ext([x + 1]$_{Nc}$)/ Feed([f + 1]$_{Nc}$)/Raff([r + 1]$_{Nc}$) | Nb1/Nb2/Nb3/Nb4 |
| At time ΔT + dT1: | El([e + 2]$_{Nc}$)/Ext([x + 1/ Feed(f + 1/Raff([r + 2]$_{Nc}$) | Nb1 − 1/Nb2/Nb3 + 1/ Nb4 |
| At time 2 × ΔT | El([e + 2]$_{Nc}$)/Ext([x + 2]$_{Nc}$)/ Feed([f + 2]$_{Nc}$)/Raff([r + 2]$_{Nc}$) | Nb1/Nb2/Nb3/Nb4 |

Several other embodiments are possible, whereby some of them are shown in the examples.

According to a characteristic of the process, it is possible during the period to perform all of the shiftings of the injection or draw-off positions with an approximately constant time phase shift and advantageously with a time phase shift that is at least equal to a quarter-period.

According to a variant, it is possible to carry out during the period the shifting of the positions of the injection or draw-off points with a non-constant time phase shift.

According to another characteristic, the flow rate of fluid that circulates in a given zone is generally kept approximately constant.

It is advantageous to carry out the shiftings of the positions of the injection and draw-off points in the same direction as that of the flow in the columns or column section.

According to another advantageous characteristic of the process, at least one flow rate of fluid that circulates in an injection or draw-off line can be monitored by the pressure in the device. Preferably, it is the flow rate of the raffinate and/or the extract, whereby the other fluids are then under flow rate control.

It is advantageously possible to use a liquid as an eluant, but it is also possible to operate with a supercritical fluid or with a subcritical fluid.

The range of pressures in which the separations of products are carried out can be between 0.1 and 50 MPa and preferably between 0.5 and 30 MPa. The temperature in the columns is generally between 0° C. and 100° C. It was observed that the process according to the invention provided excellent results when the number of columns or column sections was less than 8. For values of greater than 8, it is very advantageous to optimize the process by studying the influence of the number and the lengths of the columns in each zone that is combined at the moment of shifting during the period of the cycle.

The invention also relates to the device particularly for the implementation of the process.

More specifically, said device comprises a number of chromatographic columns or a chromatographic column section that contains an adsorbent, arranged in series and in a closed loop, whereby said loop comprises at least one pump for recirculating a fluid, a number of fluid injection lines in each column or column section that are connected to at least one injection pump and a number of fluid draw-off lines of each column or column section that are connected to at least one draw-off pump, at least one valve on each line, whereby said loop defines at least three chromatographic zones, whereby each of them is determined by a fluid injection point and a fluid draw-off point, whereby the device is characterized in that it comprises means for controlling the variation in time of the lengths of the zones that are connected to said valve and that are suitable for shifting by a column or column section the positions of the injection and draw-off points in an intermittent manner.

The valves that are used are advantageously all-or-none valves.

The process according to the invention (VARICOL) is better explained in the examples below, but its differences compared to the process of the simulated moving bed will be noted immediately:

1. The zone lengths are not constant
2. The number of columns per zone is not constant over the period
3. The inlet/outlet lines are not moved simultaneously.

Although oscillation introduces a disturbance in the system, it seems, surprisingly enough, that the performance levels of the VARICOL process are often better than those of the simulated mobile bed system (see Examples).

As explained, implementation of the process according to the VARICOL invention is cyclic, so that after a given cycle time Nc×ΔT, the system regains its initial configuration. During this cycle, the number of columns in each zone has been varied, and for teaching purposes, it may be useful to define a mean number of columns per zone:

<Nb1>=mean number of columns contained in zone 1 during a cycle

<Nb2>=mean number of columns contained in zone 2 during a cycle

<Nb3>=mean number of columns contained in zone 3 during a cycle

<Nb4>=mean number of columns contained in zone 4 during a cycle

Just as a simulated moving bed system can be presented by:

LMS Nb1/Nb2/Nb3/Nb4 we can represent a VARICOL periodic process by:

VARICOL (Nb1)/(Nb2)/(Nb3)/(Nb4)

Whereas the number of columns per zone has a real meaning for the LMS systems, however, the mean numbers which are not integers and which have no technical meaning are used simply for convenience for the VARICOL process.

EXAMPLES

Example 1

This VARICOL process has been used to achieve the separation of stereoisomers of phytol (3,7,1,15-tetramethyl- 2-hexadecen-1-ol, $C_{20}H_{40}O$). The synthetic phytol is a mixture of cis and trans isomers, whereby the latter is used in perfumery.

The separation between the isomers of phytol is accomplished on silica (Lichroprep Si 60, 25–40 micrometers of Merck KGaA, Darmstadt) with an eluant that consists of heptane-ethyl acetate (75/25 v/v) at 27° C. For the sake of simplicity, a solution that contains 50% of cis isomer and 50% of trans isomer is prepared. According to measurements that are made on the laboratory scale, the adsorption isotherms were determined and adjusted suitably on an equation model of the modified Langmuir type:

$$n_i = \lambda_i c_i + \frac{\overline{K}_i c_i}{1 + \sum_j \tilde{K}_j c_j}$$

whereby n is the concentration of space i that is adsorbed on the solid, $\lambda_1$, $\lambda_2$, $\overline{K}_1$, $\overline{K}_2$, $\tilde{K}_1$ and $\tilde{K}_2$ are adjustable parameters, whereby $C_1$ and $C_2$ are the concentrations of radicals i and j in the mobile phase.

With:

$\lambda_1 = 1.7 \quad \lambda_2 = 1.7$ $\overline{K}_1 = 0.20633 \quad \overline{K}_2 = 0.9862$ $\tilde{K}_1 = 0.00645 \quad \tilde{K}_2 = 0.0308$ Knowledge of the adsorption isotherms is not absolutely necessary to carry out the VARICOL process, but it helps to find the operating parameters that are suitable for obtaining suitable purities. The techniques that are used rely on numerical simulation methods that are described in, for example, "Fundamentals of Preparative and Non Linear Chromatography, G. Guiochon, S. Golsbran Shirazi and A. M. Katti, Academie Press, 1994."

The shiftings of the injection point or of the fluid draw-off point are done in time t, which is a fraction of the period $\Delta T$.

1. 5-Column VARICOL System

Experience has shown that for a feedstock concentration of 6.4 g/l, a suitable set of flow rates in a system that comprises 5 columns of a 2.6 cm-diameter and 16 cm length corresponds to $Q_{eluant}$ = 24.98 ml/min    $Q_{feedstock}$ = 22.08 ml/min
$Q_{extract}$ = 25.42 ml/min    $Q_{recycling}$ = 106.84 ml/min For this set of flow rates, the optimum movement period of the inlet/outlet positions is: $\Delta T = 1.6$ min for the simulated mobile bed system (LMS).

The concentrations and purities of the extract and of the raffinate that are obtained by the various processes are given in Table 4. An overall purity is defined by the mean value of the purities of the extract and the raffinate.

TABLE 4

| | | | | | | Extract | | | Raffinate | | | |
|---|---|---|---|---|---|---|---|---|---|---|---|---|
| | Configuration | | | | | cis (g/l) | trans (g/l) | purity % | cis (g/l) | trans (g/l) | purity % | Overall purity |
| VARICOL | 1.25 | 1.25 | 1.25 | 1.25 | | 0.170 | 2.690 | 94.1 | 3.060 | 0.120 | 96.2 | 95.2 |
| | t = 0 | | | 2111 | | | | | | | | |
| | t = $\Delta$T/4 | | | 1112 | | | | | | | | |
| | t = $\Delta$T/2 | | | 1121 | | | | | | | | |
| | t = 3$\Delta$T/4 | | | 1211 | | | | | | | | |
| LMS | | | | 1112 | | 0.180 | 2.560 | 93.4 | 3.050 | 0.260 | 92.1 | 92.8 |
| LMS | | | | 1121 | | 0.280 | 2.670 | 90.5 | 2.940 | 0.120 | 96.1 | 93.3 |
| LMS | | | | 1211 | | 0.180 | 2.500 | 93.3 | 3.050 | 0.260 | 92.1 | 92.7 |
| LMS | | | | 2111 | | 0.280 | 2.640 | 90.4 | 2.940 | 0.170 | 94.5 | 92.5 |
| VARICOL | 1.2 | 1.2 | 1.4 | 1.2 | | 0.185 | 2.694 | 93.6 | 3.050 | 0.108 | 96.6 | 95.1 |
| | t = 0 | | | 1112 | | | | | | | | |
| | t = $\Delta$T/5 | | | 1121 | | | | | | | | |
| | t = 3$\Delta$T/2 | | | 1211 | | | | | | | | |
| | t = 4$\Delta$T/5 | | | 2111 | | | | | | | | |

TABLE 4

[Key to Table 4:]

Extrait = Extract
pureté = purity
Raffinat = raffinate
pureté globale = overall purity All of the possible configurations of the simulated moving bed (for a 5-column system) are present in Table 4. The best mean purity (93.3%) is obtained by the configuration 1/1/2/1.

The 4-zone VARICOL process with a 1.25 column makes it possible to obtain a mean purity of 95.2%, which is therefore about 2% greater than the best result that is obtained with the LMS process. Let us emphasize that this ability of the VARICOL process to obtain higher purities with columns and flow rates that are similar to those of the LMS is extremely interesting.

The second implementation of the VARICOL process makes it possible to illustrate an operation for which the time phase shift from line to line is not identical and which also shows good results.

2. 8-Column Systems

To keep the length of the column and the amount of stationary phase constant in the system, the length of each of the columns was reduced to 10 cm. The same flow rates as those in the 5-column system were used by adjusting the period to $\Delta T=1$ min.

The concentrations and purities that are obtained in the flow of the extract and raffinate for the various processes are presented in Table 5. An overall purity is defined as the mean value of the purities of the extract and the raffinate.

increase the number of columns within the framework of the process according to the invention and/or to change the flow rates that are used.

Example 2

The separation between fructose and glucose was studied in a Dowex 99 monosphere (350 micrometers) in the form of calcium that uses water (65° C.) as an eluant. Under these conditions, the adsorption isotherms are nearly linear, and the retention factors of the two sugars are provided by:

$$\overline{K}_{Gluc} = 0.25 \quad \overline{K}_{Fruct} = 0.45.$$

1. 5-Column Systems

Experience has shown that for a feedstock concentration of 50 g/l of each radical, a suitable set of flow rates for a system that consists of columns with a 2.6 cm diameter and 160 cm length is:

TABLE 5

|  | Configuration |  |  |  | Extract | | | Raffinate | | | Overall purity |
|---|---|---|---|---|---|---|---|---|---|---|---|
|  |  |  |  |  | cis (g/l) | trans (g/l) | purity % | cis (g/l) | trans (g/l) | purity % |  |
| VARICOL 1 | 1.5<br>t = 0<br>t = $\Delta$T/2 | 2.5 | 1.5<br>1313<br>2222 | 2.5 | 0.80 | 2.680 | 97.1 | 3.170 | 0.130 | 96.1 | 96.6 |
| VARICOL 2 | 2.5<br>t = 0<br>t = $\Delta$T/2 | 2.5 | 1.5<br>2312<br>3221 | 1.5 | 0.130 | 2.720 | 95.4 | 3.110 | 0.090 | 97.2 | 96.3 |
| VARICOL 3 | 1.5<br>t =0<br>t = $\Delta$T/2 | 1.5 | 2.5<br>1223<br>2132 | 2.5 | 0.180 | 2.770 | 93.9 | 3.060 | 0.030 | 99.0 | 96.5 |
| LMS |  | 2222 |  |  | 0.110 | 2.720 | 96.100 | 3.240 | 0.070 | 97.8 | 97.0 |

TABLE 5

[Key to Table 5:]

Extrait = Extract
pureté= purity
Raffinat = raffinate
pureté= globale = overall purity In this case, the purities of LMS are already high (about 97%), and it was not possible to improve on these results with the VARICOL process. The way to obtain higher purities would be to increase the column lengths and/or to $Q_{eluant} = 18.13$ ml/min   $Q_{feedstock} = 13.76$ ml/min $Q_{extract} = 16.57$ ml/min   $Q_{recycling} = 90.36$ ml/min For this set of flow rates, the optimum displacement period of the position of inlets/outputs is: $\Delta T=6.4$ minutes for the simulated moving bed (LMS).

TABLE 6

|  | Configuration |  |  |  | Extract | | | Raffinate | | | Overall purity |
|---|---|---|---|---|---|---|---|---|---|---|---|
|  |  |  |  |  | Glucose (g/l) | Frucrose (g/l) | Purity % | Glucose (g/l) | Frucrose (g/l) | Purity % |  |
| VARICOL | 1.25<br>t = 0<br>t = $\Delta$T/4<br>t = $\Delta$T/2<br>t = 3$\Delta$T/4 | 1.25 | 1.25<br>1112<br>1121<br>1211<br>2111 | 1.25 | 2.710 | 39.380 | 93.6 | 41.890 | 2.450 | 94.5 | 94.1 |
| LMS |  | 1112 |  |  | 2.860 | 37.010 | 92.8 | 41.820 | 4.870 | 89.6 | 92.2 |
| LMS |  | 1121 |  |  | 4.500 | 39.190 | 89.7 | 40.040 | 2.500 | 94.1 | 91.9 |
| LMS |  | 1211 |  |  | 2.540 | 37.010 | 89.7 | 42.130 | 4.870 | 89.6 | 89.7 |
| LMS |  | 2111 |  |  | 4.500 | 38.660 | 89.7 | 40.040 | 3.090 | 92.8 | 91.3 |

[Key to Table 6:]
Extrait=extract
pureté=purity
Raffinat=raffinate
pureté globale=overall purity The improvement that is obtained thanks to the 4-zone VARICOL process with a 1.25 column (Table 6) is also very significant here. The overall purity is nearly 3% greater than that obtained in the case of a standard LMS.

2. Systems with 6, 7, and 8 Columns

Other experiments were carried out and are presented in Tables 7, 8, and 9.

The total column lengths and the flow rates were kept constant in the two types of tests for the same system. For each case, the period and the lengths of the columns were adjusted.

6-Column System: L=1.33 m, ΔT=5.32 min

TABLE 7

| | | | Extract | | | Raffinate | | | Overall |
|---|---|---|---|---|---|---|---|---|---|
| | Configuration | | Glucose (g/l) | Fructose (g/l) | Purity % | Glucose (g/l) | Fructose (g/l) | Purity % | purity % |
| VARICOL | 1.5   1.5   1.5   1.5 t = 0            1212 t = ΔT/2      2121 | | 2.11 | 39.94 | 95.0 | 42.50 | 1.88 | 95.8 | 95.4 |
| LMS | 1122 | | 3.29 | 38.73 | 92.2 | 41.35 | 3.00 | 93.2 | 92.7 |
| LMS | 1212 | | 1.02 | 36.37 | 97.3 | 43.79 | 5.56 | 88.7 | 93.0 |
| LMS | 2112 | | 3.29 | 38.19 | 92.1 | 41.35 | 3.59 | 92.0 | 92.0 |
| LMS | 1221 | | 2.97 | 38.73 | 92.9 | 41.67 | 3.00 | 93.3 | 93.1 |
| LMS | 2121 | | 5.05 | 40.78 | 89.0 | 39.44 | 0.78 | 98.1 | 93.5 |
| LMS | 2211 | | 2.97 | 38.19 | 92.8 | 41.67 | 3.59 | 92.1 | 92.4 |

[Key to Table 7:]
Extrait=extract
Pureté=purity
Raffinat=raffinate
pureté globale=overall purity 7-Column System: L=1.14 m, ΔT=4.56 min

[Key to Table 8:]
Extrait=extract
Pureté=purity
Raffinat=raffinate
pureté globale=overall purity

TABLE 8

| | | | Extract | | | Raffinate | | | Overall |
|---|---|---|---|---|---|---|---|---|---|
| | Configuration | | Glucose (g/l) | Fructose (g/l) | Purity % | Glucose (g/l) | Fructose (g/l) | Purity % | purity % |
| VARICOL | 1.75   1.75   1.75   1.75 t = 0            1222 t = ΔT/4      2122 t = ΔT/2      2212 t = 3ΔT/4    2221 | | 1.81 | 40.24 | 95.7 | 42.83 | 1.54 | 96.5 | 96.1 |
| LMS | 1222 | | 1.3 | 38.30 | 96.7 | 43.49 | 3.47 | 92.6 | 94.7 |
| LMS | 2122 | | 3.68 | 40.52 | 91.7 | 40.93 | 1.07 | 97.5 | 94.6 |
| LMS | 2212 | | 1.3 | 37.76 | 96.7 | 43.49 | 4.07 | 91.4 | 94.1 |
| LMS | 2221 | | 3.36 | 40.52 | 92.3 | 41.25 | 1.07 | 97.5 | 94.9 |

TABLE 9

| Type | Configuration | | | | Extract Glucose (g/l) | Extract Frucrose (g/l) | Extract Purity % | Raffinate Glucose (g/l) | Raffinate Frucrose (g/l) | Raffinate Purity % | Overall purity % |
|---|---|---|---|---|---|---|---|---|---|---|---|
| LMS | 2222 | | | | 1.62 | 40.20 | 96.1 | 43.15 | 1.41 | 96.8 | 96.5 |
| VARICOL | 1.75 | 1.75 | 2.25 | 2.25 | 1.79 | 40.27 | 95.7 | 42.93 | 1.44 | 96.8 | 96.2 |
| | t = 0 | | | 2132 | | | | | | | |
| | t = ΔT/4 | | | 2222 | | | | | | | |
| | t = 3ΔT/4 | | | 1223 | | | | | | | |
| VARICOL | 1.75 | 2.25 | 1.75 | 2.25 | 1.26 | 39.73 | 96.9 | 43.49 | 1.99 | 95.6 | 96.3 |
| | a t= 0 | | | 2222 | | | | | | | |
| | a t = 3ΔT/4 | | | 1313 | | | | | | | |
| VARICOL | 1.75 | 2.25 | 2.25 | 1.75 | 1.67 | 40.33 | 96.0 | 42.69 | 1.42 | 96.8 | 96.4 |
| | t = 0 | | | 1322 | | | | | | | |
| | t = ΔT/4 | | | 2222 | | | | | | | |
| | t = 3ΔT/4 | | | 2231 | | | | | | | |
| VARICOL | 2.25 | 1.75 | 2.25 | 1.75 | 2.17 | 40.72 | 94.9 | 42.46 | 1.00 | 97.7 | 96.3 |
| | t = 0 | | | 2222 | | | | | | | |
| | t = 3ΔT/4 | | | 3131 | | | | | | | |
| VARICOL | 2.25 | 1.75 | 1.75 | 2.25 | 1.74 | 40.09 | 95.8 | 42.94 | 1.55 | 96.5 | 96.2 |
| | t = 0 | | | 2213 | | | | | | | |
| | t = ΔT/4 | | | 2222 | | | | | | | |
| | t = 3ΔT/4 | | | 3122 | | | | | | | |
| VARICOL | 2.25 | 2.25 | 1.75 | 1.75 | 1.7 | 40.24 | 95.9 | 42.91 | 1.52 | 96.6 | 96.3 |
| | t = 0 | | | 3221 | | | | | | | |
| | t = ΔT/4 | | | 2222 | | | | | | | |
| | t = 3ΔT/4 | | | 2312 | | | | | | | |

8-Column System, L=1 m, ΔT=4 min

An analysis of the results that are presented in Tables 6, 7, 8, and 9 leads to the following conclusions:

- A 5-column VARICOL system is more efficient than all of the possible LMS 5 columns
- A 6-column VARICOL system is more efficient than all of the possible LMS 6 columns,
- A 7-column VARICOL system is more efficient than all of the possible LMS 7 columns,
- A 5-column VARICOL system makes it possible to attain purities that are equivalent to that which is obtained with an LMS with 6 columns. The VARICOL process therefore does not allow a significant reduction in cost,
- The VARICOL process is more advantageous for a system whose number of columns is less than 8.

What is claimed is:

1. A process for separating at least one component of a mixture that contains it, comprising introducing said mixture into a device that has a set of chromatographic columns or chromatographic column sections that contain an adsorbent and are arranged in series and in a closed loop, whereby the loop comprises at least one feedstock injection point, a raffinate draw-off point, an eluant injection point, and an extract draw-off point, in which a chromatographic zone is determined between an injection point and a draw-off point or vice-versa, and at the end of a given period of time, shifting all of the injection and draw-off points by one column or column section in a given direction that is defined relative to that of the flow of a main fluid that circulates through the loop, and during said period, shifting different injection and draw-off points of a column or column section at different times such that the lengths of the zones that are defined by said different points are variable.

2. A process according to claim 1, comprising at least once:

At time t1 during said period shifting the position of the injection point or draw-off point in a given direction relative to at least one zone by a column or column section in such a way as to increase the length of said zone and to reduce the length of the zone that is adjacent to said zone, and then at time t2 during said period, shifting the position of an injection or draw-off point that is relative to at least one other zone in the same direction by a column or column section in such a way as to increase the length of said other zone and to reduce the length of the zone that is adjacent to said other zone, and optionally repeating the operation such that after said time period, the same column or column section configuration as the initial configuration is regained with a shifting of all of the positions of the injection points and draw-off points of a column or a column section.

3. A process according to claim 1, wherein during the period, all of the shiftings of injection or draw-off positions are carried out with a time phase shift that is approximately constant.

4. A process according to claim 1, wherein during the period, shiftings of the positions of the injection or draw-off points are carried out with a non-constant time phase shift.

5. A process according to claim 1, wherein the flow rate of fluid that circulates in a given zone is kept approximately constant.

6. A process according to claim 1, wherein said shiftings are carried out in the same direction as that of flow in the loop.

7. A process according to claim 1, wherein at least one flow rate of fluid that circulates in an injection or draw-off line is controlled by pressure in the device.

8. A process according to claim 7, wherein the flow rate of fluid drawn off as raffinate, extract or both is controlled by pressure.

9. A process according to claim 1, wherein the eluant is a liquid or a supercritical or subcritical fluid.

10. A process according to claim 1, wherein the number of columns is less than 8.

11. A process according to claim 1, wherein the loop comprises four chromatographic zones.

12. A process for the separation of stereoisomers, comprising subjecting a mixture of stereoisomers to a process according to claim 1.

13. A process according to claim 1, wherein during the period, all of the shiftings of injection or draw-off positions are carried out with a time phase shift that is at least equal to one quarter-period.

\* \* \* \* \*

UNITED STATES PATENT AND TRADEMARK OFFICE
CERTIFICATE OF CORRECTION

PATENT NO. : 6,136,198
DATED : October 24, 2000
INVENTOR(S) : Phillippe Adam et al.

It is certified that error appears in the above-identified patent and that said Letters Patent is hereby corrected as shown below:

Title page,
Item [73], please add -- Novasep, France --

Column 13,
Line 56, delete "shifting" and after "points," insert -- are shifted. --
Line 66, after "period" delete "shifting".

Column 14,
Line 30, after "section" insert -- is shifted --.
Line 33, after "period," delete "shifting".
Line 35, after "section", insert -- is shifted --.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,136,198
DATED         : October 24, 2000
INVENTOR(S)   : Philippe Adam et al.

It is certified that error appears in the above-identified patent and that said Letters Patent is hereby corrected as shown below:

<u>Title page,</u>
Item [73], add -- NOVASEP, France --

Signed and Sealed this

Twelfth Day of August, 2003

JAMES E. ROGAN
*Director of the United States Patent and Trademark Office*